US009528655B1

(12) United States Patent
Miles

(10) Patent No.: US 9,528,655 B1
(45) Date of Patent: Dec. 27, 2016

(54) TENSIONING TIE DOWN APPARATUS

(71) Applicant: Kevin J. Miles, Medford, OR (US)

(72) Inventor: Kevin J. Miles, Medford, OR (US)

( * ) Notice: Subject to any disclaimer, the term of this patent is extended or adjusted under 35 U.S.C. 154(b) by 0 days.

(21) Appl. No.: 14/972,306

(22) Filed: Dec. 17, 2015

Related U.S. Application Data

(63) Continuation-in-part of application No. 13/757,758, filed on Feb. 2, 2013, now Pat. No. 9,433,261.

(60) Provisional application No. 62/097,550, filed on Dec. 29, 2014.

(51) Int. Cl.
| | | |
|---|---|---|
| *F16B 45/00* | (2006.01) | |
| *A44B 13/00* | (2006.01) | |
| *F16M 13/02* | (2006.01) | |

(52) U.S. Cl.
CPC ........ *F16M 13/022* (2013.01); *A44B 13/0029* (2013.01); *Y10T 24/314* (2015.01); *Y10T 24/4755* (2015.01)

(58) Field of Classification Search
CPC .. F16M 13/022; B60P 7/0823; Y10T 24/4755; F16G 11/00
USPC ............................... 24/265 H, 300, 301, 302
See application file for complete search history.

(56) References Cited

U.S. PATENT DOCUMENTS

| | | | |
|---|---|---|---|
| D34,114 S | 2/1901 | Stagg et al. | |
| 1,685,145 A | * 9/1928 | Bartenbach ............. | F16B 45/00 24/698.1 |
| D132,017 S | 4/1942 | Amstein | |
| 2,322,576 A | 6/1943 | Huebshman | |
| 2,372,967 A | 4/1945 | Martin | |
| 3,348,273 A | 10/1967 | Clarence | |
| D234,946 S | 4/1975 | Fredriksson et al. | |
| 3,953,911 A | * 5/1976 | Fishack ................... | F16G 11/00 24/130 |
| D266,374 S | 10/1982 | Drake | |
| 4,622,724 A | * 11/1986 | Dupre ..................... | F16B 45/00 24/115 H |
| 4,831,692 A | * 5/1989 | Chuan ..................... | F16G 11/00 24/129 B |
| 5,317,788 A | 6/1994 | Esposito et al. | |
| 5,366,327 A | 11/1994 | Nelson | |
| 5,385,435 A | 1/1995 | Musta | |
| D373,526 S | 9/1996 | Roethler | |

(Continued)

*Primary Examiner* — Robert J Sandy
*Assistant Examiner* — Rowland Do
(74) *Attorney, Agent, or Firm* — Jerry Haynes Law

(57) ABSTRACT

A tensioning tie down apparatus enables a securing member to intertwine through multiple apertures and gaps in a tensioning member to generate tension through the securing member, which helps securely tie down objects and restrict slippage of the securing member. A securing member has a first securing member end and a second securing member end. The securing member is configured to have sufficient tensile strength and resiliency to stretch and bend, which helps create tension on the securing member. The tension helps tie down an object into a secure position, while also inhibiting slippage. The tensioning member has a hook shaped mounting member that forms a mounting gap. An extension member extends from the mounting member. A base extends perpendicularly form the extension member. The base is defined by a plurality of apertures. A base shaft extends from the base to form a base gap. One intertwining configuration has the securing member looping around mounting gap, the base gap, the apertures, and the object.

19 Claims, 10 Drawing Sheets

(56) References Cited

U.S. PATENT DOCUMENTS

| | | | |
|---|---|---|---|
| 5,630,257 A * | 5/1997 | Brody | B60P 7/0823 |
| | | | 24/130 |
| 5,651,633 A | 7/1997 | Howe | |
| D389,728 S | 1/1998 | Fitzwater | |
| D412,100 S | 7/1999 | Kruse et al. | |
| 6,000,108 A * | 12/1999 | Roan | B66C 1/36 |
| | | | 24/265 H |
| 6,094,784 A | 8/2000 | Schrader | |
| 6,292,984 B1 | 9/2001 | Nelson | |
| 6,308,383 B1 | 10/2001 | Schrader | |
| 6,401,309 B1 * | 6/2002 | Yang | F16G 11/00 |
| | | | 24/115 H |
| D478,805 S | 8/2003 | Winig et al. | |
| 6,772,929 B1 | 8/2004 | Stein | |
| 6,923,356 B2 * | 8/2005 | Reynolds | A45F 3/14 |
| | | | 224/254 |
| D524,636 S | 7/2006 | Burnett | |
| 7,214,014 B2 | 5/2007 | Stanley | |
| 7,306,417 B2 | 12/2007 | Dorstewitz | |
| D646,151 S | 10/2011 | Potts et al. | |
| D661,175 S | 6/2012 | Dahl et al. | |
| 8,272,108 B2 | 9/2012 | Langtry et al. | |
| D694,613 S | 12/2013 | Miles | |
| 2011/0146558 A1 | 6/2011 | Korell et al. | |
| 2012/0297582 A1 * | 11/2012 | Lee | A63B 21/0557 |
| | | | 24/265 H |
| 2013/0014352 A1 * | 1/2013 | Wells | B60J 7/104 |
| | | | 24/265 H |

* cited by examiner

TENSIONING TIE DOWN APPARATUS

CROSS-REFERENCE TO RELATED APPLICATIONS

This application claims the benefit of U.S. provisional application No. 62/097,550, filed Dec. 29, 2014 and entitled TENSIONING TIE DOWN APPARATUS, and is a continuation-in-part of U.S. parent application Ser. No. 13/757,758, filed Feb. 2, 2013 and entitled TIE DOWN SYSTEM, each of which provisional application and parent application is hereby incorporated by reference herein in its entirety.

FIELD OF THE INVENTION

The present invention relates generally to tie downs. More so, the present invention relates to a tensioning tie down apparatus that intertwines at least one securing member through at least one tensioning member having multiple apertures and gaps to generate tension along the length of the at least one securing member, which helps to securely tie down objects of various sizes and shapes.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
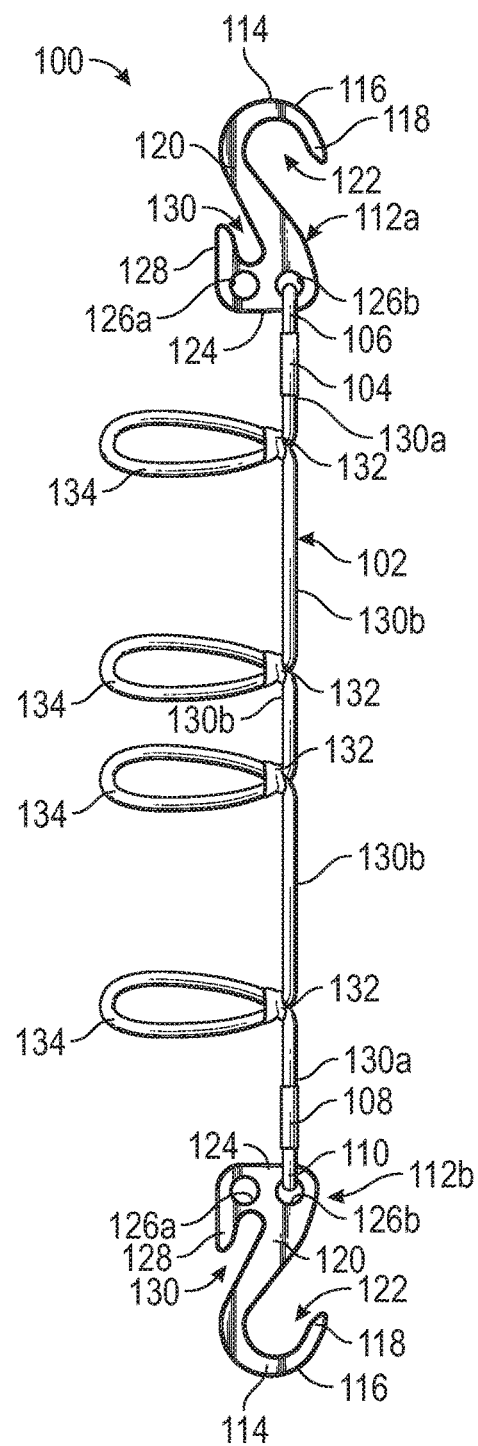
FIG. 1 is a side view of an illustrative embodiment of the tensioning tie down apparatus.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Referring initially to FIGS. 1-14 of the drawings, an illustrative embodiment of a tensioning tie down apparatus 100, hereinafter apparatus 100, is generally indicated by reference numeral 100. The tensioning tie down apparatus 100 is configured to intertwine at least one securing member 102, hereinafter securing member 102, through at least one of a first tensioning member 112a and a second tensioning member 112b, each having multiple apertures 126a, 126b and gaps 122, 130, to generate tension along a longitudinal axis 402 (FIG. 4) of the securing member 102. The tension applied to the securing member 102 may be effective for helping to securely tie down objects of various sizes and shapes and also to restrict slippage of the securing member 102. An illustrative embodiment of the tensioning tie down apparatus 100 includes at least one elongated securing member 102 having a first securing member end 104 and a second securing member end 108. The securing member 102 may be configured to have sufficient tensile strength and resiliency to stretch, bend, and generally create tension along the length of the securing member 102. Accordingly, the securing member 102 may include any device or structure which is suitable for the purpose. Non-limiting examples for the securing member 102 include a rope, cord, chain or cable. The tension applied on the securing member 102 helps tie down an object into a secure position while also inhibiting slippage and detachment from the securing member ends 104, 108. The first and second securing member ends 104, 108 of the securing member 102 may have sufficient freedom to detachably join to each other, to other sections of the apparatus 100, and to various mounting surfaces. For example and without limitation, a first securing member loop 106 may be formed in the first securing member end 104 and a second securing member loop 110 may be formed in the second securing member end 108. This versatility is effective for tying down variously sized and shaped objects on myriad mounting surfaces.

The apparatus 100 further includes at least one tensioning member 112a, 112b that works in conjunction with the securing member 102. Each of the first tensioning member 112a and the second tensioning member 112b may have a unique U-shape. Each of the first tensioning member 112a and the second tensioning member 112b may include multiple apertures 126a, 126b and mounting gaps 122, 130 that may receive the securing member 102 in a series of bending and twisting configurations, as will be hereinafter described. This intertwining configuration may create the optimal amount of tension along the length of the securing member 102 while also restricting slippage between the securing member 102 and the tensioning member 112a, 112b.

Figure 2:
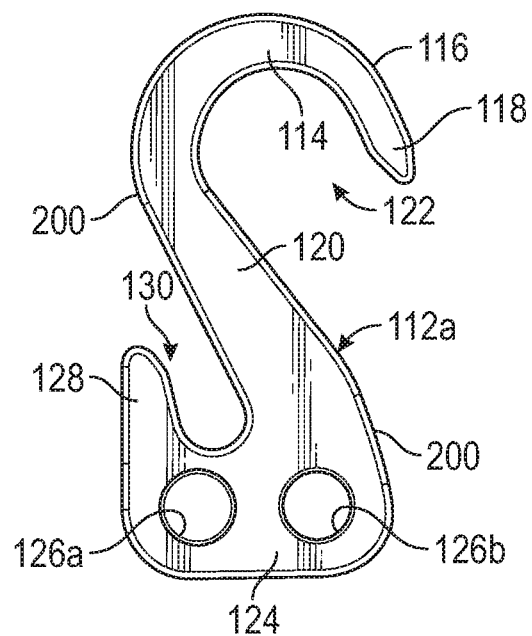
FIG. 2 is a side view of an exemplary tensioning member of the tensioning tie down apparatus illustrated in FIG. 1.
Figure 3:
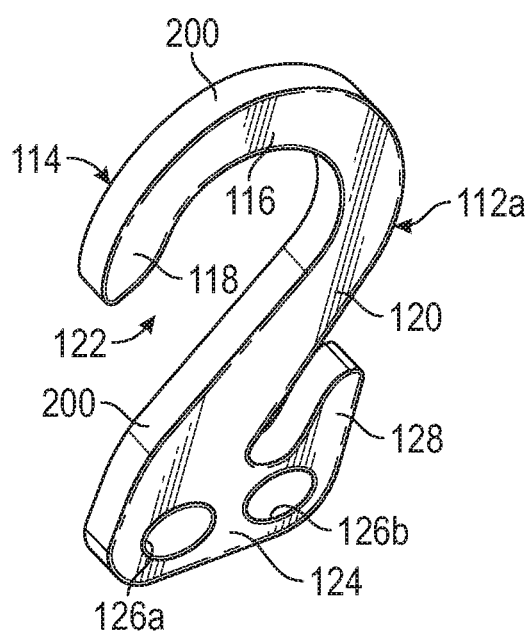
FIG. 3 is a perspective view of the exemplary tensioning member illustrated in FIG. 2.

As particularly illustrated in FIGS. 2 and 3, each of the first tensioning member 112a and the second tensioning member 112b may include a substantially curved or U-shaped mounting member 114. The mounting member 114 may have a hook shape which enables the tensioning member 112a to hang onto a mounting surface or onto a second tensioning member 112b. A mounting finger 116 may extend from the mounting member 114. The mounting finger 116 may terminate in a mounting terminus 118, which may be tapered in some embodiments.

An extension member 120 may extend from the mounting member 114. In some embodiments, the extension member 120 may be generally rigid and may extend in a general straight or perpendicular orientation from the mounting member 114. In other embodiments, the extension member 120 may, however, extend from the mounting member 114 at an angle. A mounting gap 122 may be formed by the extension member 120, the mounting member 114, the mounting finger 116 and the mounting terminus 118 on a first side of the extension member 120. In application of the tensioning tie down apparatus 100, which will be hereinafter described, the securing member 102 may pass through or loop around the mounting gap 122. The mounting gap 122 may also be used to hang the tensioning member 112a on a mounting structure 136 (FIGS. 12-14) such as a post, beam, pole, bar or like structure, or alternatively, to facilitate engagement of a first tensioning member 112a with a second tensioning member 112b.

In some embodiments, a base 124 may form at the end of the extension member 120. The base 124 may be generally elongated and disposed generally perpendicular to the extension member 120. The base 124 may be oriented in either direction relative to the mounting member 114. The base 124 may include a plurality of apertures 126a, 126b, such as a primary aperture 126a and a secondary aperture 126b, for example and without limitation. In other embodiments, more than two apertures 126a, 126b may, however, be provided in the base 124. The apertures 126a, 126b may enable passage of the securing member 102 through the tensioning member 112a, 112b. The apertures 126a, 126b may be arranged such that the securing member 102 intertwines between each aperture 126a, 126b and bends around the base 124, a base gap 130 and the extension member 120 to pass through each aperture 126a, 126b. This bending configuration of the securing member 102 may create extra tension on the securing member 102 and may also form frictional surfaces between the base 124 and extension member 120 that reduce slippage of the securing member 102. In some embodiments, the base 124 may be generally elongated. The primary aperture 126a and the secondary aperture 126b may be disposed in adjacent relationship to each other along the longitudinal axis of the base 124, as illustrated.

A base shaft 128 may extend from the base 124 in a spaced-apart relationship to the extension member 120. In some embodiments, the base shaft 128 may be angled relative to a longitudinal axis of the base 124. In other embodiments, the base shaft 128 may be perpendicular to the longitudinal axis of the base 124. A base gap 130 may form between the base shaft 128, the base 124 and the extension member 120. The base gap 130 may be disposed on a second side of the extension member 120. The base gap 130 may enable passage of the securing member 102 such that the securing member 102 bends and twists between the base 124 and the base shaft 128 to rest inside the base gap 130. This bending and twisting configuration of the securing member 102 may create extra tension on the securing member 102 and may also form additional frictional surfaces for the securing member 102 along the base 124 and base shaft 128 that reduce slippage there between.

One aspect of the tensioning tie down apparatus 100 may include:
  at least one securing member 102, the at least one securing member 102 having a first securing member end 104 and a second securing member end 108;
  at least one tensioning member 112a, 112b including:
    a base 124;
    a plurality of apertures 126a, 126b in the base 124, the plurality of apertures 126a, 126b configured to enable passage of the securing member 102;
    a generally elongated extension member 120 extending from the base 124;
    a curved mounting member 114 extending from the extension member 120;
    a mounting gap 122 between the mounting member 114 and the extension member 120, the mounting gap 122 configured to enable passage of the securing member 102;
    a base shaft 128 extending from the base 124 in spaced-apart relationship to the extension member 120; and
    a base gap 130 between the base shaft 128 and the extension member 120, the base gap 130 configured to enable passage of the securing member 102,
    wherein passage of the securing member 102 through at least one of the plurality of apertures 126a, 126b, the mounting gap 122 and the base gap 130 at least partially generates tension on the securing member 102.

In a second aspect, the plurality of apertures 126a, 126b may include a primary aperture 126a and a secondary aperture 126b.

In another aspect, the plurality of apertures 126a, 126b may include a primary aperture 126a and a secondary aperture 126b and the securing member 102 may extend through the secondary aperture 126b, the base gap 130 and the mounting gap 122, respectively.

In another aspect, a mounting finger 116 may terminate the mounting member 114.

In another aspect, the mounting member 114 may further include a tapered mounting terminus 118 terminating the mounting finger 116.

In another aspect, the base 124, the base shaft 128, the extension member 120, the mounting member 114, the mounting finger 116 and the mounting terminus 118 may at least be partially bound by a planar and continuous perimeter surface 200.

In another aspect, the apparatus 100 may further include a securing member lock 700 (FIG. 8) having a plurality of securing member openings 706a-c and wherein a first securing member 802 extends through a first one of the plurality of securing member openings 706a, and further comprising a second securing member 804 extending through at least a second one of the plurality of securing member openings 706b.

In another aspect, another exemplary securing member lock 900 (FIGS. 9 and 10) may include a pair of curved securing member lock sides 902 and a pair of curved securing member lock 904 ends terminating and extending between the securing member lock sides 902, and wherein a plurality of securing member openings 906a-d comprises first, second, third and fourth securing member openings.

One objective of the present invention is to provide a tensioning tie down apparatus that generates tension on a securing member 102 to securely tie down at least one object.

Another objective is to create tension on the securing member 102 by intertwining the securing member 102 between a series of apertures 126a, 126b and gaps 122, 130 in at least one tensioning member 112a, 112b.

Yet another objective is to provide a securing member lock 700 that may work in conjunction with at least one tensioning member 112a, 112b and at least one securing member 102 to extend the fastening capability of the apparatus 100.

Yet another objective is to provide an apparatus 100 that is inexpensive to manufacture and easy to use for tying down at least one object.

As referenced in FIG. 1, the apparatus 100 may include at least one elongated, flexible securing member 102. In some embodiments, the securing member 102 may include braided or non-braided nylon, polypropylene and/or other suitable tough, durable and non-elastic material. In other embodiments, the securing member 102 may include a stretchable material such as a bungee cord, for example and without limitation. In still other embodiments, the securing member 102 may include a rope, cord, chain or cable, for example and without limitation.

The securing member 102 may have a first securing member end 104 and a second securing member end 108. The first and second securing member ends 104, 108 of the securing member 102 may have sufficient freedom to detachably join to each other, to other sections of the apparatus 100, and to various mounting surfaces or structures. This versatility may be efficacious for tying down variously sized and shaped objects. The securing member 102 may be configured to have sufficient tensile strength and resiliency to stretch, bend, and generally create tension along a longitudinal axis 402 (FIG. 4) of the securing member 102. The tension applied on the securing member 102 may help tie down an object into a secure position while also inhibiting slippage and forced detachment.

In some embodiments, a first tensioning member 112a and a second tensioning member 112b may terminate opposite securing member ends 104, 108 of the securing member 102. Each tensioning member 112a, 112b is configured to work in conjunction with the securing member 102. Each tensioning member 112a, 112b may utilize a unique shape and multiple apertures 126a, 126b and gaps 122, 130 to bend and twist the securing member 102 in a configuration that creates the optimal amount of tension in the securing member 102, while restricting slippage between the securing member 102 and the respective tensioning member 112a, 112b.

The first tensioning member 112a and the second tensioning member 112b may each include a base 124. The base 124 of each of the first tensioning member 112a and the second tensioning member 112b may be attached to the securing member 102 in a manner which will be hereinafter described. The base 124 may be oriented in the same direction as the mounting member 114, or the base 124 may alternatively be disposed in an opposite direction of the mounting member 114. A plurality of apertures 126a, 126b may extend through the base 124 in generally adjacent relationship to each other. The apertures 126a, 126b may enable passage of the securing member 102. The apertures 126a, 126b may be arranged such that the securing member 102 intertwines between each aperture 126a, 126b, bending around the base 124 and the extension member 120. This may create extra tension on the securing member 102 and may also form frictional surfaces along the base 124 and the extension member 120 that reduce slippage between the securing member 102 and the object being held by the securing member 102.

A base shaft 128 extends from the base 124. In some embodiments, the base shaft 128 may form an angle relative to a longitudinal axis of the base 124. In other embodiments, the base shaft 128 may be disposed in generally perpendicular relationship to a longitudinal axis of the base 124. An elongated extension member 120 may extend from the base 124, and a curved or U-shaped mounting member 114 may extend from the extension member 120. A mounting finger 116 may extend from the mounting member 114. The mounting finger 116 may terminate in a mounting terminus 118 which may be tapered in some embodiments, as illustrated in FIG. 2. In some embodiments, the mounting member 114 may form a substantially hook shape. A mounting gap 122 may be formed by the extension member 120, the mounting member 114, the mounting finger 116, and the mounting terminus 118.

The extension member 120 may be disposed in adjacent and spaced-apart relationship to the base shaft 128. A base gap 130 may be formed between the base shaft 128 and the extension member 120. In some embodiments, the base 124, the base shaft 128, the extension member 120, the mounting member 114, the mounting finger 116 and the mounting terminus 118 may be bound by a flat or planar and continuous perimeter surface 200. The first tensioning member 112a and the second tensioning member 112b may each include metal, plastic, carbon fiber composite and/or other material which is consistent with the functional requirements of the tensioning tie down apparatus 100.

The first tensioning member 112a and the second tensioning member 112b may be attached to the securing member 102 using any suitable attachment technique which is known by those skilled in the art and suitable for the purpose. In some embodiments, the securing member 102 may terminate in the first securing member end 104 in which is formed the first securing member loop 106 and the second securing member end 108 in which is formed the second securing member loop 110. In some embodiments, each of the first securing member loop 106 and the second securing member loop 110 may be secured using a loop stay 132. In some applications, the first securing member end 104 may extend through one or both of the primary aperture 126a and the secondary aperture 126b in the base 124 of the first tensioning member 112a. The second securing member end 108 may extend through one or both of the primary aperture 126a and the secondary aperture 126b in the base 124 of the second tensioning member 112b.

Figure 4:
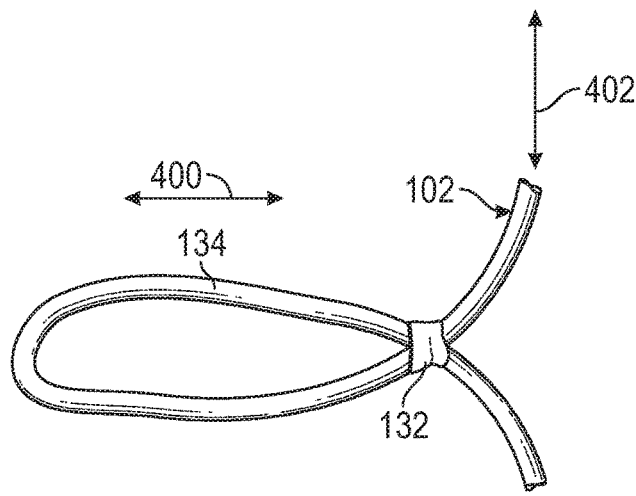
FIG. 4 is a side view, partially in section, of an exemplary intermediate securing member loop of the tensioning tie down apparatus.

As illustrated in FIG. 1, in some embodiments, at least one intermediate securing member loop 134 may extend from the securing member 102 between the first securing member end 104 and the second securing member end 108. In some embodiments, multiple intermediate securing member loops 134 may extend from the securing member 102 at spaced-apart intervals. For example and without limitation, in some embodiments, the intermediate securing member loops 134 may be provided on the securing member 102 at spaced-apart intervals of about 12 inches with respect to each other. A primary securing member segment 130a may extend between the first tensioning member 112a and the next succeeding intermediate securing member loop 134 and between the second tensioning member 112b and the next succeeding intermediate securing member loop 134, respectively, on the securing member 102. A secondary securing member segment 130b may extend between each pair of adjacent intermediate securing member loops 134. Depending on the number of intermediate securing member loops 134, any number of the secondary securing member segments 130b may extend between the adjacent intermediate securing member loops 134. As illustrated in FIG. 4, each intermediate securing member loop 134 may have a longitudinal axis 400 which is oriented in generally perpendicular relationship to a longitudinal axis 402 of the securing member 102. Tension may be created on the intermediate securing member loop 134 along either or both of the longitudinal axes 400, 402.

Each intermediate securing member loop 134 may be attached to the securing member 102 according to any suitable attachment technique which is known by those skilled in the art and which is consistent with the functional requirements of the tie down apparatus 100. For example and without limitation, as illustrated in FIG. 4, in some embodiments, each intermediate securing member loop 134 may be formed as a looped extension of the securing member 102 and secured using a loop stay 132 or the like. In other embodiments, the securing member 102 and the intermediate securing member loop 134 may be formed as separate components. Each intermediate securing member loop 134 may be attached to the securing member 102 via sewing, mechanical fasteners and/or other suitable attachment technique.

Figure 5:
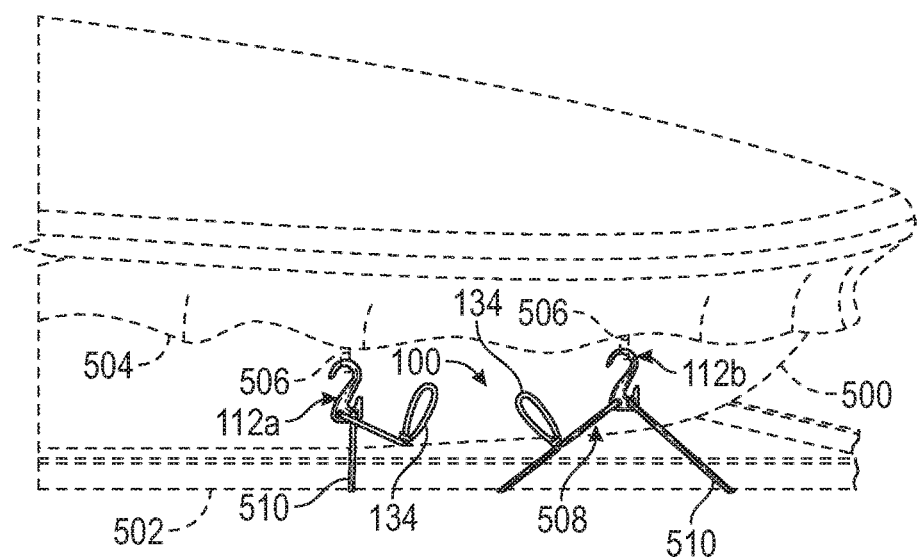
FIG. 5 is a side view, partially in section, of a boat supported on a boat trailer and a boat cover (each illustrated in phantom) on the boat, with the exemplary tensioning tie down apparatus securing the boat cover on the boat.

Referring next to FIG. 5 of the drawings, in exemplary application, the apparatus 100 may be used to secure a boat cover 504 on a boat 500 which may be supported by a boat trailer 502. The boat cover 504 may be standard or conventional and may include multiple boat cover straps 506 which extend from the perimeter of the boat cover 504 in spaced-apart relationship to each other. Accordingly, a first securing member loop 106 (FIG. 1) on a first securing member 508 may be secured through the primary aperture 126a or the secondary aperture 126b (FIG. 2) of a first tensioning member 112a of the apparatus 100. A second securing member loop 110 (FIG. 1) on the first securing member 508 may be secured through the primary aperture 126a or the secondary aperture 126b of a second tensioning member 112b. The first tensioning member 112a may be attached to a first boat cover strap 506 on the boat cover 504 by extending the mounting finger 116 of the first tensioning member 112a through the first boat cover strap 506. The first securing member 508 may be extended downwardly around the lower surface of the boat trailer 502 and then pulled upwardly, and the second tensioning member 112b attached to a second boat cover strap 506 on the boat cover 504. Additional apparatuses 100 may be used to secure the remaining pairs of boat cover straps 506 to the boat trailer 502 in a similar manner around the perimeter of the boat cover 504. The apparatus 100 therefore retains the boat cover 504 on the boat 500 in a secure manner for covered storage and/or transport of the boat 500 on the boat trailer 502. The apparatus 100 may be removed from the boat cover by disengaging the first tensioning member 112a and the second tensioning member 112b from the respective boat cover straps 506.

In some applications, a second securing member 510 may be used to attach each pair of adjacent tensioning members 112a, 112b to each other. Accordingly, a first securing member end (not illustrated) of the first securing member 508 may be threaded through the primary aperture 126a and the secondary aperture 126b in the base 124 of each of the first tensioning member 112a and the second tensioning member 112b, and tied or otherwise secured to prevent the first securing member 508 from pulling through the primary aperture 126a and the secondary aperture 126b. The free second securing member end of the first securing member 508 may be extended beneath the boat trailer 502 and likewise threaded through and secured in the primary aperture 126a and/or the secondary aperture 126b in the first tensioning member 112a or the second tensioning member 112b of the adjacent apparatus 100. This creates a tension that helps secure the second securing member 510 into place around the boat trailer 502.

Figure 6:
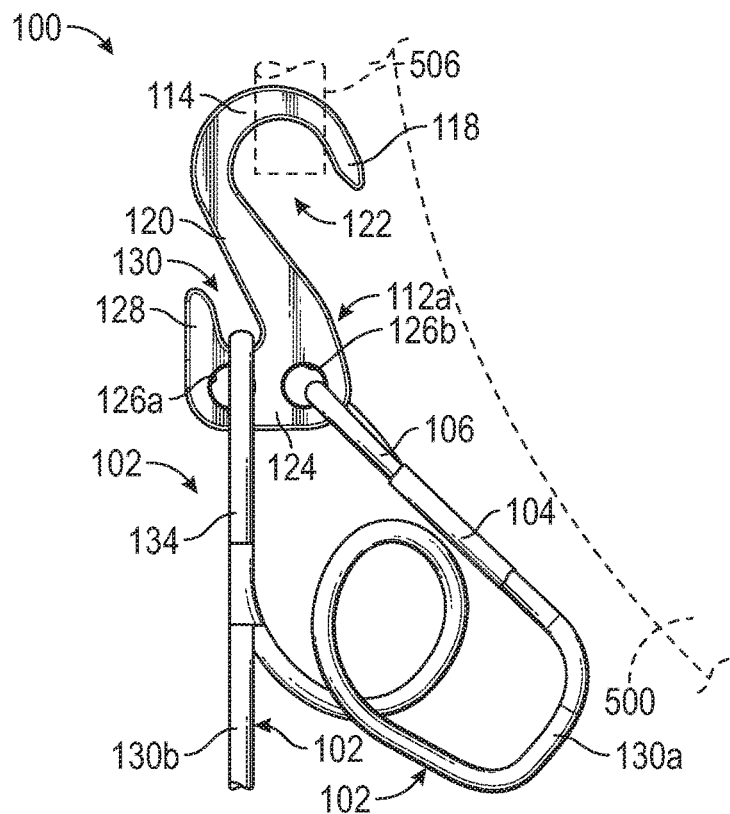
FIG. 6 is a side view, partially in section, of the exemplary tensioning tie down apparatus with the securing member deployed in a shortened configuration in exemplary application of the tensioning tie down apparatus.

Referring next to FIG. 6 of the drawings, it will be appreciated by those skilled in the art that the length of the securing member 102 can be selectively shortened as deemed necessary depending on the particular application of the apparatus 100. For example, in some applications it may be necessary or desirable to reduce the length of the securing member 102 of one or more of the apparatuses 100 in order to achieve a secure and snug fit of the boat cover 504 on the boat 500. Accordingly, the first tensioning member 112a and the second tensioning member 112b of the apparatus 100 may initially be attached to the respective boat cover straps 506 on the boat cover 504 as was heretofore described with respect to FIG. 5, with the securing member 102 extending beneath the boat trailer 502. One of the intermediate securing member loops 134 may then be pulled upwardly and inserted in the base gap 130 between the base shaft 128 and the extension member 120 of the first tensioning member 112a and/or the second tensioning member 112b. This action shortens and tensions the securing member 102 and slackens the primary securing member segment 130a between the first securing member loop 106 and the next succeeding intermediate securing member loop 134 along the securing member 102.

Figure 7:
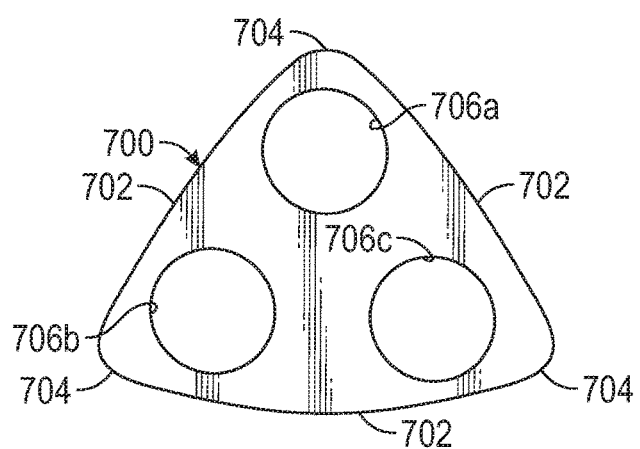
FIG. 7 is a front view of an exemplary securing member lock of an illustrative embodiment of the tensioning tie down apparatus.

Referring next to FIG. 7 of the drawings, in some embodiments, the apparatus 100 may include a securing member lock 700. The securing member lock 700 may be generally triangular with three rope lock sides 702 and three rope lock corners 704. First, second and third securing member openings 706a-c, respectively, may extend through the securing member lock 700 generally at the respective rope lock corners 704. The securing member lock 700 may be metal, plastic, carbon fiber composite and/or other material which is consistent with the functional requirements of the apparatus 100.

Figure 8:
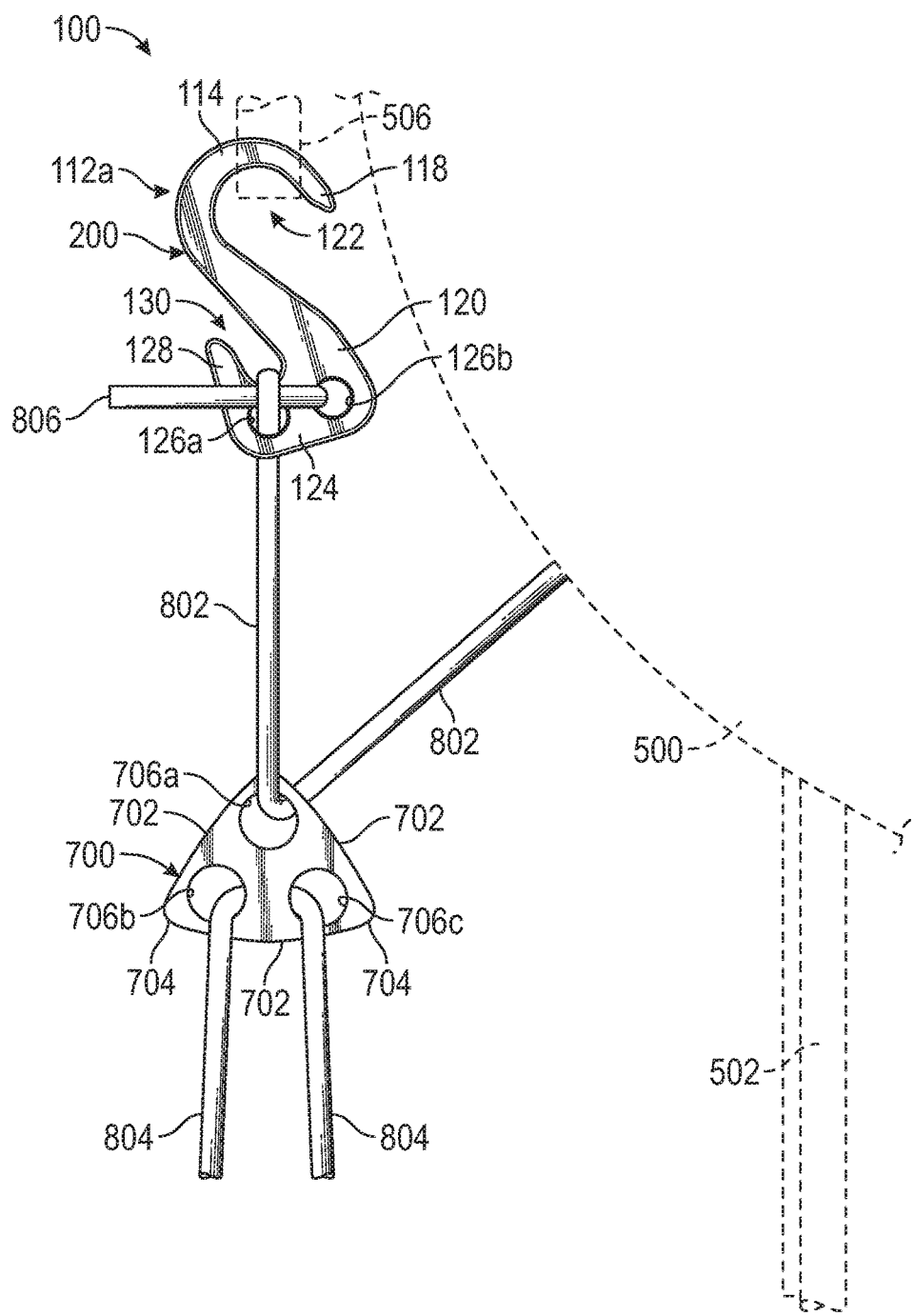
FIG. 8 is a side view, partially in section, of an exemplary tensioning tie down apparatus utilizing a tensioning member and a securing member lock in securing a boat cover on a boat according to exemplary application of the tensioning tie down apparatus.

Referring next to FIG. 8 of the drawings, exemplary application of a tensioning member 112a with a securing member lock 700 in securing a boat cover 504 (FIG. 5) on a boat 500 in exemplary application of a tensioning tie down apparatus 100 is shown. A first tensioning member 112a may be attached to a boat cover strap 506 on the boat cover 504. A first end 806 of a first securing member 802 may initially be threaded through a first securing member opening 706a in the securing member lock 700 and then through the primary aperture 126a and the secondary aperture 126b, respectively, in the base 124 of the first tensioning member 112a. The second end (not illustrated) of the first securing member 802 may be likewise attached to a second tensioning member (not illustrated in FIG. 8) which engages a boat cover strap 506 on the boat cover 504. A second securing member 804 may be threaded through the second securing member opening 706b and the third securing member opening 706c, respectively, in the securing member lock 700. A second pair of the first tensioning member 112a and the second tensioning member (not illustrated in FIG. 8) may be attached to the respective ends of the second securing member 804. The first tensioning member 112a and the second tensioning member 112b on the second securing member 804 may be engaged with the boat trailer 502 to tension the first securing member 802 and the second securing member 804 and anchor or secure the boat cover 504 on the boat 500.

Figure 9:
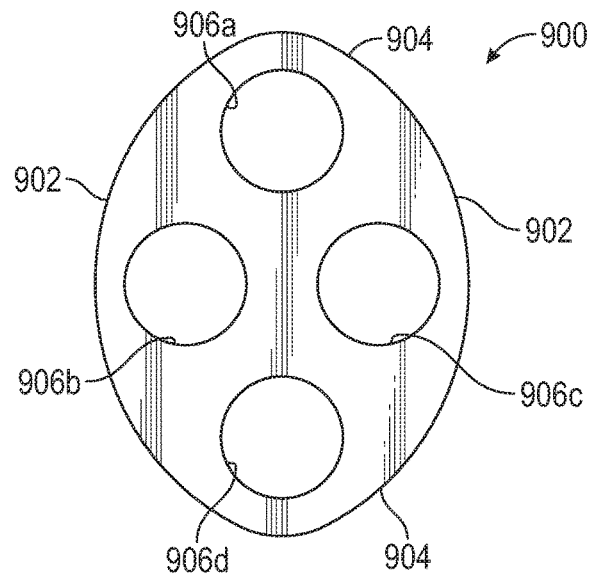
FIG. 9 is a front view of an alternative exemplary securing member lock element of an illustrative embodiment of the tensioning tie down apparatus.
Figure 10:
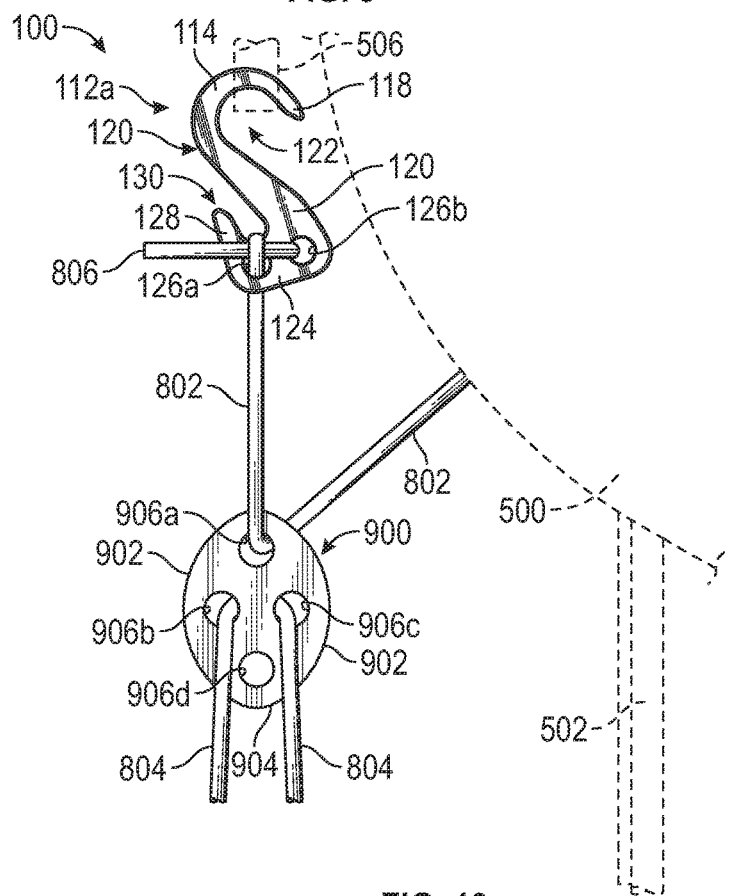
FIG. 10 is a side view, partially in section, of an exemplary tensioning tie down apparatus utilizing a tensioning member and a securing member lock illustrated in FIG. 9 in securing a boat cover on a boat according to exemplary application of the tensioning tie down system.
Figure 11:
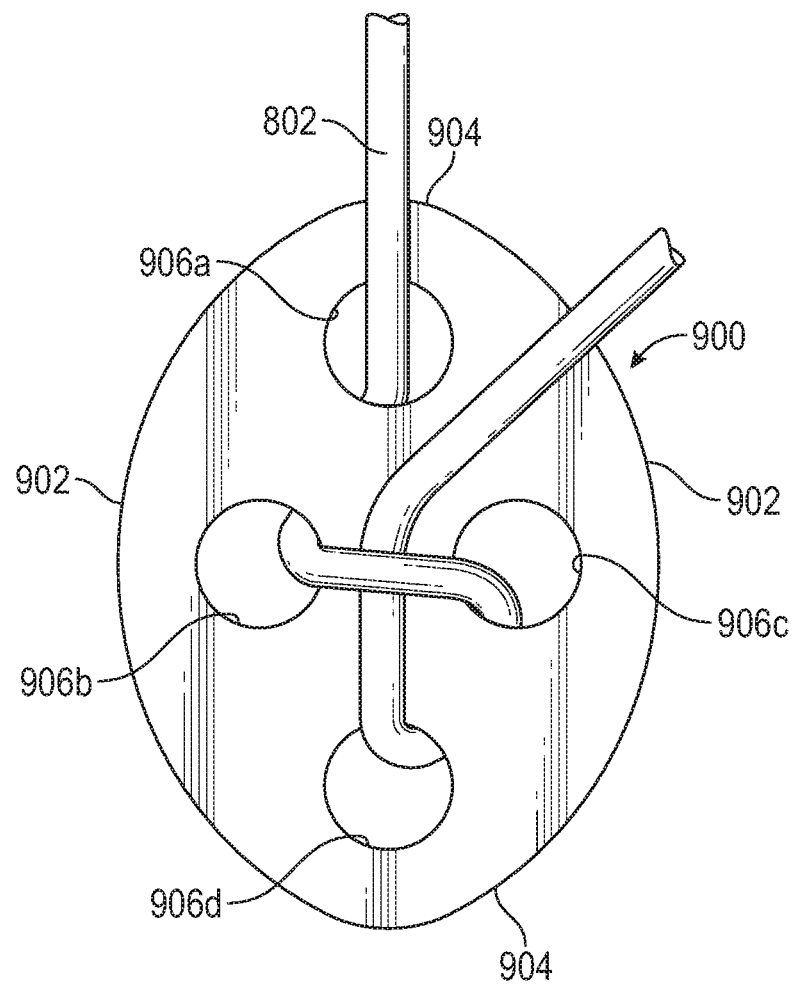
FIG. 11 is a front view of the exemplary securing member lock illustrated in FIG. 9, more particularly illustrating an alternative threading configuration of a securing member of the tensioning tie down apparatus through the securing member openings of the securing member lock.

Referring next to FIGS. 9-11 of the drawings, an alternative exemplary securing member lock 900 includes a pair of curved securing member lock sides 902 and a pair of curved securing member lock ends 904 terminating and extending between the securing member lock sides 902. First, second, third and fourth securing member lock openings 906a-d respectively, may extend through the securing member lock 900 at the respective securing member lock sides 902 and securing member lock ends 904. As illustrated in FIG. 10, exemplary application of the securing member lock 900 may be as was heretofore described with respect to the securing member lock 700 in FIG. 8. Accordingly, the first securing member end 806 of a first securing member 802 may initially be threaded through the first securing member opening 906a in the securing member lock 900 and then through the primary aperture 126a and the secondary aperture 126b in the base 124 of the first tensioning member 112a. The second securing member end (not illustrated) of the first securing member 802 may be likewise attached to a tensioning member (not illustrated in FIG. 10) which engages a boat cover strap 506 on the boat cover 504. A second securing member 804 may be threaded through the second securing member opening 906b and the third securing member opening 906c, respectively, in the securing member lock 900. A second pair of the first tensioning member 112a and the second tensioning member (not illustrated in FIG. 10) may be attached to the respective ends of the second securing member 804. The first tensioning member 112a and the second tensioning member 112b on the second securing member 804 may be engaged with the boat trailer 502 to tension the first securing member 802 and the second securing member 804 and anchor or secure the boat cover 504 on the boat 500. An alternative threading configuration of the first securing member 802 through the securing member openings 906a-c of the rope lock 900 is shown in FIG. 11.

Figure 12:
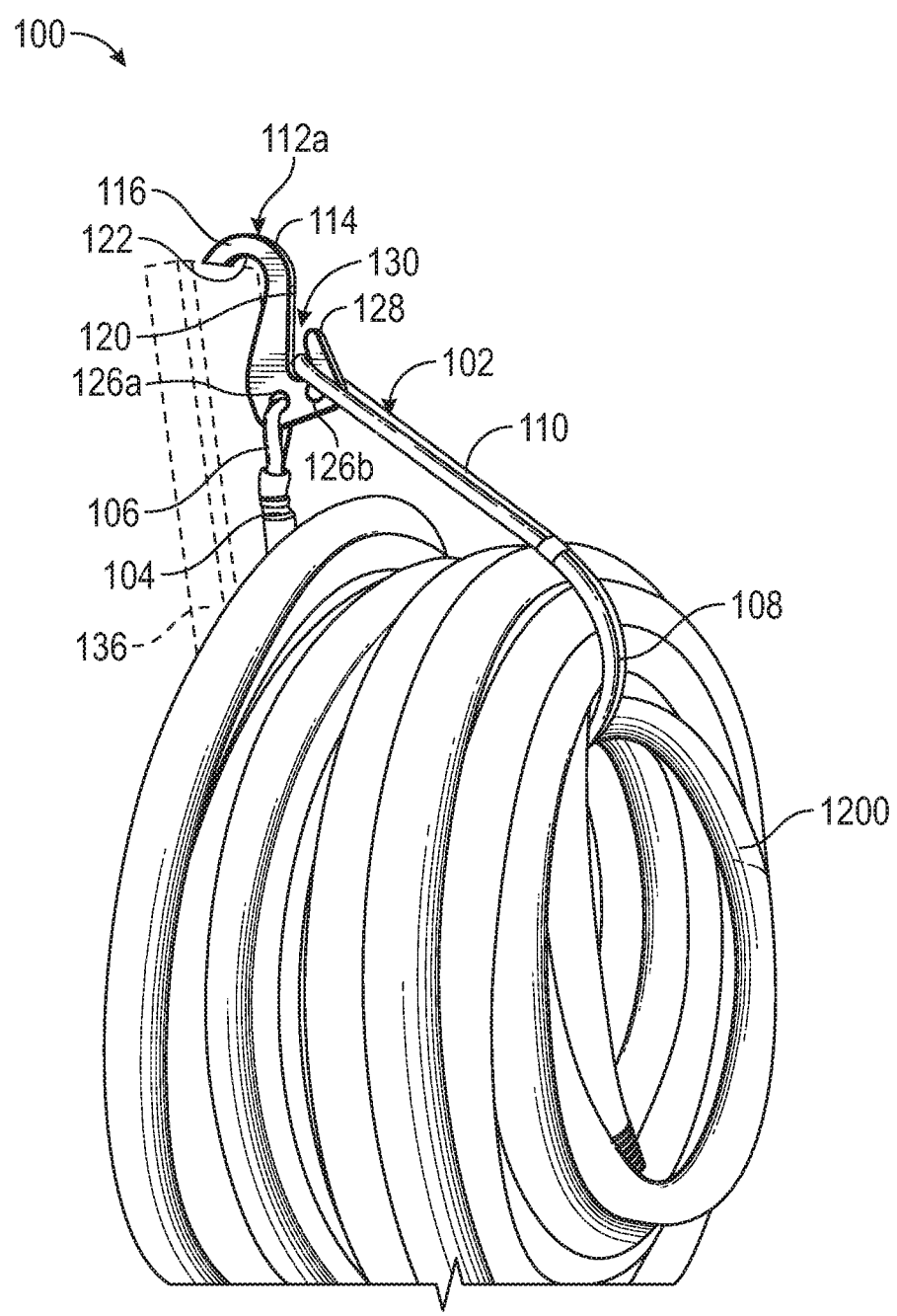
FIG. 12 is a perspective view of an exemplary securing member of the tensioning tie down apparatus, wrapped around and securing a coiled hose with a first securing member loop of the securing member extending through an exemplary primary aperture and a second securing member loop of the securing member extending through a base gap and around an exemplary base shaft of the tensioning member in typical application of the tensioning tie down apparatus.

FIG. 12 is a perspective view of an illustrative embodiment of the tensioning tie down apparatus 100 in supporting a coiled hose 1200 on a mounting structure 136. The mounting structure 136 may be a post, beam, pole, bar or like structure. Accordingly, a tensioning member 112a of the tensioning tie down apparatus 100 may be hanged on the mounting structure 136 typically by engagement of the mounting finger 116 with the upper or other suitable surface, or alternatively, with an opening or concavity (not illustrated) in or on the mounting structure 136. Thus, in some applications, the mounting finger 116 may engage the upper surface of the mounting structure 136 with an upper edge (not illustrated) of the mounting structure 136 extending through the mounting gap 122 (FIG. 2), as illustrated in FIG. 12.

The first securing member loop 106 on the first securing member end 104 of the securing member 102 may be fixed to the base 124 of the tensioning member 112 by threading the first securing member loop 106 through the primary aperture 126a in the base 124 and securing the first securing member loop 106 typically using a loop stay 132 (FIG. 1) or other technique known by those skilled in the art. The second securing member loop 110 on the free second securing member end 108 of the securing member 102 may be extended through the open center of the coiled hose 1200, after which the second securing member loop 110 may be hanged on the base shaft 128 at the base gap 130.

Although not shown in FIG. 12, in some applications, the second securing member loop 110 on the free second securing member end 108 of the securing member 102 may first be threaded through the secondary aperture 126b in the base 124 of the tensioning member 112a and then extended through the open center of the coiled hose 1200, pulled upwardly against the weight of the hose 1200 and hanged on the base shaft 128, respectively. Alternatively, the second securing member loop 110 may first be extended through the open center of the coiled hose 1200, pulled upwardly against the weight of the hose 1200 and then threaded through the secondary aperture 126b and hanged on the base shaft 128, respectively. Either action intertwines the securing member 102 with the tensioning member 112 and shortens, slackens and tensions the securing member 102 around the hose 1200 to more securely support the hose 1200 on the mounting structure 136. Part of the tension applied to the securing member 102 is created by the weight of the hose 1200, and part of the tension is created by the intertwining configuration of the securing member 102. These tensioning forces help tie down the hose 1200 on the mounting structure 136. Accordingly, the apparatus 100 retains the hose 1200 in a secure manner. The apparatus 100 may be unsecured to facilitate removal of the hose 1200 from the mounting structure 136 by disengaging the second securing member loop 110 from the base shaft 128 at the base gap 130 and then unthreading the securing member 102 through the secondary aperture 126b. The first securing member loop 106 on the first securing member end 104 of the securing member 102 may be removed from the primary aperture 126a.

Figure 13:
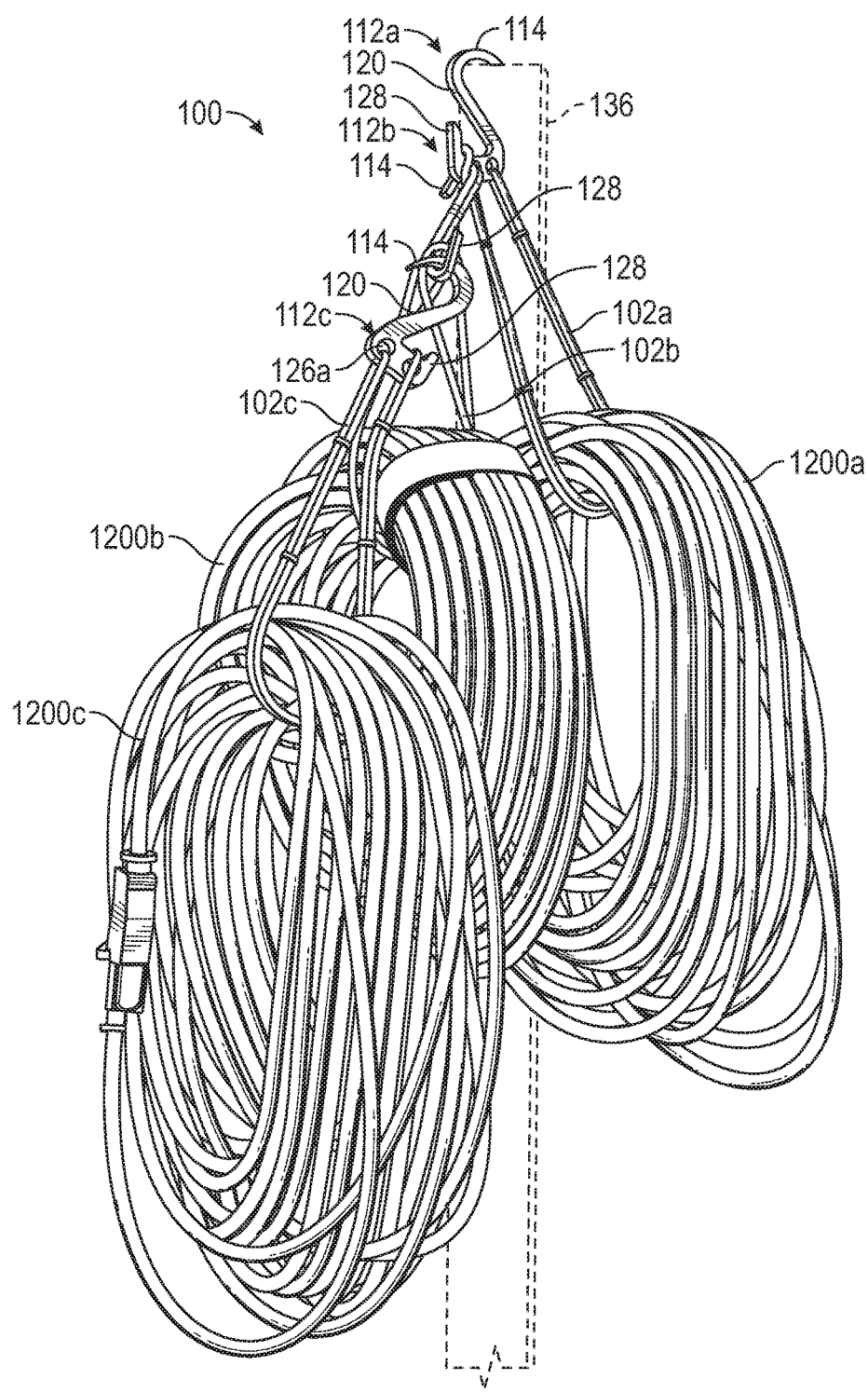
FIG. 13 is a perspective view of multiple tensioning members and corresponding securing members supporting multiple coiled hoses from a single mounting surface in typical application of the tensioning tie down apparatus.

FIG. 13 is a perspective view of an illustrative embodiment of the tensioning tie down apparatus 100 in which multiple tensioning members 112a, 112b, 112c support corresponding coiled hoses 1200a-1200c on a single mounting structure 136. Accordingly, the first tensioning member 112a may engage the mounting structure 136 typically as was heretofore described in FIG. 12. The first securing member loop 106 (FIG. 1) on a first securing member 102a may be threaded through the primary aperture 126a (FIG. 2) in the base 124 of the first tensioning member 112a, and secured. The free second securing member loop 110 on the first securing member 102a may be extended through the open center of a first coiled hose 1200a and hanged on the base shaft 128 of the first securing member 102a.

A second tensioning member 112b may be attached to the first tensioning member 112a typically by extending the mounting member 114 on the second tensioning member 112b through the secondary aperture 126b in the base 124 of the first tensioning member 112a. The first securing member loop 106 on a second securing member 102b may be threaded through the primary aperture 126a in the base 124 of the second tensioning member 112b and secured. The free second securing member loop 110 on the second securing member 102b may be extended through the open center of a second coiled hose 1200b and hanged on the base shaft 128 of the second tensioning member 112b.

A third tensioning member 112c may be attached to the second tensioning member 112b by extending the mounting member 114 on the third tensioning member 112c through the secondary aperture 126b in the base 124 of the second tensioning member 112b. The first securing member loop 106 on the third securing member 102c may be threaded through the primary aperture 126a in the base 124 of the third tensioning member 112c and secured. The free second securing member loop 110 on the third securing member 102c may be extended through the open center of a third coiled hose 1200c and hanged on the base shaft 128 of the third tensioning member 112c.

As they pass and intertwine through the primary apertures 126a of the first tensioning member 112a, the second tensioning member 112b and the third tensioning member 112c, respectively, and the space in the first coiled hose 1200a, the second coiled hose 1200b and the third coiled hose 1200c, the first securing member 102a, the second securing member 102b and the third securing member 102c are tensioned sufficiently so as to create a secure tie down for the hoses 1200a-1200c. Part of the tension is created by the weight of the hoses 1200a-1200c, and part of the tension is created by the intertwining configuration of the securing members 102a-102c. This creates a tension that helps tie down the hoses 1200a-1200c on the mounting structure 136. Thus, the apparatus 100 retains the hoses 1200a-1200c in a secure manner.

The third hose 1200c may be removed from the apparatus 100 for use typically by first disengaging the mounting member 114 of the third tensioning member 112c from the secondary aperture 126b of the second tensioning member 112b and then disengaging the second securing member loop 110 on the third securing member 102c from the base shaft 128 on the third tensioning member 112c. In like manner, the second hose 1200b may be removed from the apparatus 100 for use typically by first disengaging the mounting member 114 of the second tensioning member 112b from the secondary aperture 126b of the first tensioning member 112a and then disengaging the second securing member loop 110 on the second securing member 102b from the base shaft 128 on the second tensioning member 112b. The first hose 1200a may be removed from the apparatus 100 for use typically by disengaging the mounting member 114 of the first tensioning member 112a from the mounting structure 136 and disengaging the second securing member loop 110 on the first securing member 102a from the base shaft 128 on the first tensioning member 112a.

Figure 14:
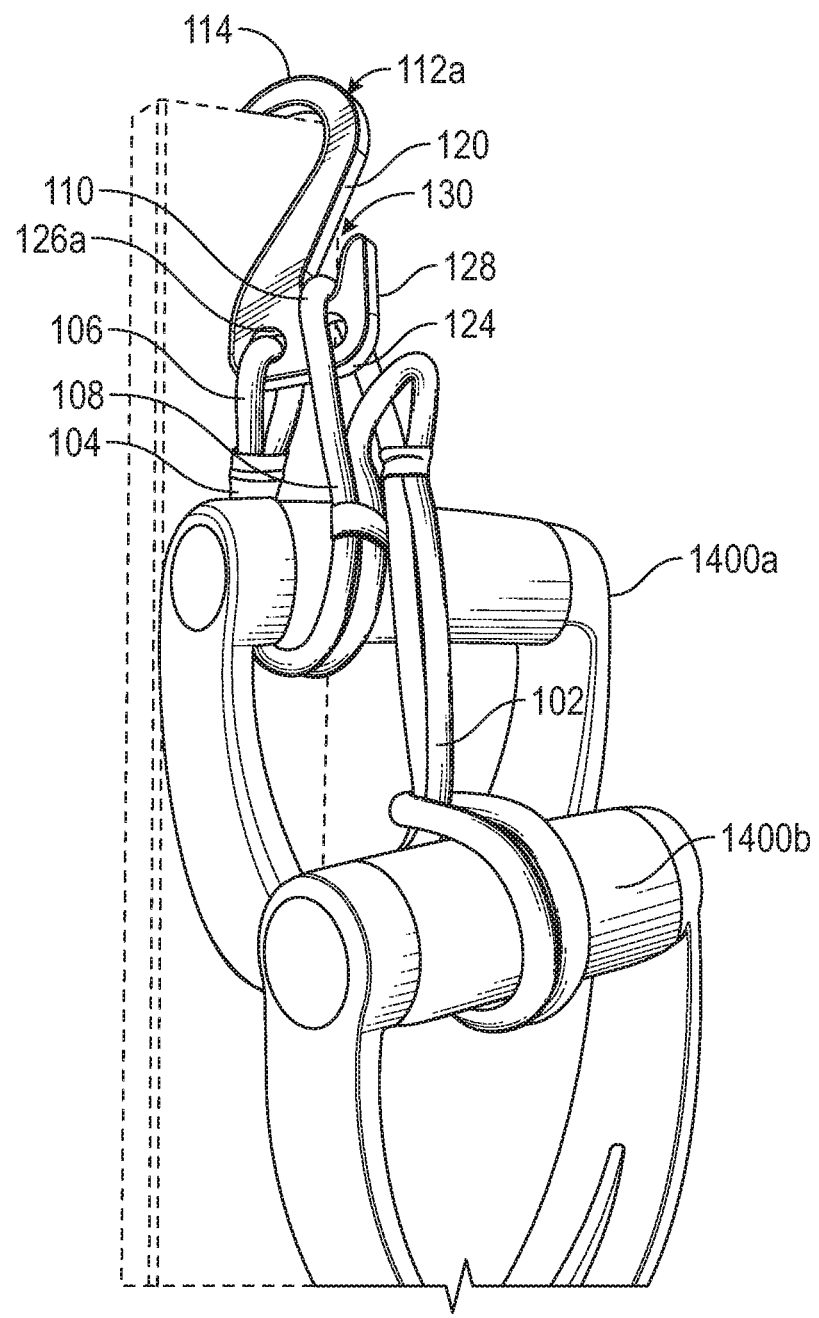
FIG. 14 is a close-up view of an exemplary threading configuration of the securing member passing around two exemplary shovel handles of a pair of shovels, with a first securing member end of the securing member forming a first securing member loop around an exemplary primary aperture in the tensioning member and a second securing member end of the securing member forming a second securing member loop around an exemplary base shaft of the tensioning member in typical application of the tensioning tie down apparatus.

FIG. 14 is a close-up view of an exemplary threading configuration of the exemplary securing member 102 passing around two shovel handles 1400a, 1400b of a respective pair of shovels, with a first securing member end 104 of a securing member 102 forming a first securing member loop 106 through the primary aperture 126a in the base 124 of the tensioning member 112a and a second securing member end 108 of the securing member 102 forming a second securing member loop 110 through the base gap 130 and engaging the base shaft 128 of the tensioning member 112a. The free second securing member loop 110 at the second securing member end 108 of the securing member 102 may be extended through the center of the first handle 1400a and the securing member 102 wrapped around the first handle 1400a, and then the second securing member loop 100 pulled downwardly and extended through the center of the second handle 1400b and the securing member 102 likewise wrapped around the second handle 1400b. The second securing member loop 110 may then be pulled upwardly and inserted in the base gap 130 between the base shaft 128 and the extension member 120 of the tensioning member 112a. This action shortens, tensions and removes slack from the securing member 102 between the first securing member loop 106 and the second handle 1400b. The apparatus 100 therefore retains the handles 1400a, 1400b in a secure manner. The apparatus 100 may be removed from the handles 1400a, 1400b typically by disengaging the second securing member loop 110 of the securing member 102 from the base gap 130 at the base shaft 128. The first securing member loop 106 of the securing member 102 may also be disengaged from the primary aperture 126a of the tensioning member 112a.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A tensioning tie down apparatus for tying down an object through tension, the apparatus comprising:
   a securing member, the securing member having a first securing member end and a second securing member end;
   at least one tensioning member including:
      a base;
      a plurality of apertures in the base, the plurality of apertures configured to enable passage of the securing member;
      a generally elongated extension member extending from the base;
      a curved mounting member extending from the extension member;
      a mounting gap between the mounting member and the extension member, the mounting gap configured to enable passage of the securing member;
      a base shaft extending from the base in spaced-apart relationship to the extension member; and a base gap between the base shaft and the extension member, the base gap configured to enable passage of the securing member; and wherein passage of the securing member through at least one of the plurality of apertures, the mounting gap, and the base gap at least partially generates tension on the securing members;

wherein the apparatus further comprises a securing member lock having a plurality of securing member openings, and wherein a first securing member extends through a first one of the plurality of securing member openings, and further comprising a second securing member extending through at least a second one of the plurality of securing member openings.

2. The apparatus of claim 1 wherein the securing member is fabricated from a resilient material.

3. The apparatus of claim 2 wherein the securing member is a rope, a cord, a chain or a cable.

4. The apparatus of claim 1 wherein the plurality of apertures comprises a primary aperture and a secondary aperture.

5. The apparatus of claim 4 wherein the primary aperture and the secondary aperture are disposed in adjacent relationship to each other along a longitudinal axis of the base.

6. The apparatus of claim 1 wherein the plurality of apertures comprises a primary aperture and a secondary aperture and the securing member extends through the secondary aperture, the base gap, and the mounting gap, respectively.

7. The apparatus of claim 1 wherein the mounting member further comprises a tapered mounting terminus terminating a mounting finger.

8. The apparatus of claim 1 wherein the securing member lock comprises a pair of curved securing member lock sides and a pair of curved securing member lock ends terminating and extending between the securing member lock sides, and wherein the plurality of securing member openings comprises first, second, third and fourth securing member openings.

9. The apparatus of claim 8 further comprising a loop stay securing the securing member loop.

10. The apparatus of claim 1 wherein the base, the base shaft, the extension member, the mounting finger and the mounting terminus are at least partially bound by a planar and continuous perimeter surface.

11. The apparatus of claim 1 further comprising a securing member loop formed in the first securing member end of the securing member, the securing member loop extends through one of the plurality of apertures.

12. A tensioning tie down apparatus for tying down an object through tension, the apparatus comprising:
a securing member, the securing member having a first securing member end, a first securing member loop formed in the first securing member end, a second securing member end and a second securing member loop formed in the second securing member end;
at least one tensioning member including:
a base;
a plurality of apertures in the base, the plurality of apertures configured to enable passage of the securing member, the first securing member loop of the securing member extending through one of the plurality of apertures;
a generally elongated extension member extending from the base;
a curved mounting member extending from the extension member;
a mounting gap between the mounting member and the extension member on a first side of the extension member, the mounting gap configured to enable passage of the securing member;
a base shaft extending from the base in spaced-apart relationship to the extension member; and
a base gap between the base shaft and the extension member on a second side of the extension member, the base gap configured to enable passage of the securing member and the second securing member loop of the securing member extending through the base gap and detachably engaging the base shaft;
a securing member lock having a plurality of securing member openings, and wherein a first securing member extends through a first one of the plurality of securing member openings, and further comprising a second securing member extending through at least a second one of the plurality of securing member openings; and
wherein passage of the securing member through at least one of the plurality of apertures, the mounting gap, and the base gap at least partially generates tension on the securing member.

13. The apparatus of claim 12 wherein the securing member is fabricated from a resilient material.

14. The apparatus of claim 12 wherein the securing member is a rope, a cord, a chain or a cable.

15. The apparatus of claim 12 wherein the plurality of apertures comprises a primary aperture and a secondary aperture disposed in adjacent relationship to each other along a longitudinal axis of the base, and wherein the first securing member loop extends through the primary aperture.

16. The apparatus of claim 15 wherein the securing member extends through the secondary aperture.

17. A tensioning tie down apparatus for tying down an object through tension, the apparatus comprising:
a first securing member, the first securing member having a first securing member end, a first securing member loop formed in the first securing member end, a second securing member end and a second securing member loop formed in the second securing member end;
a first tensioning member including:
a base;
a plurality of apertures in the base, the plurality of apertures configured to enable passage of the securing member, the first securing member loop of the securing member extending through one of the plurality of apertures;
a generally elongated extension member extending from the base;
a curved mounting member extending from the extension member;
a mounting gap between the mounting member and the extension member on a first side of the extension member, the mounting gap configured to enable passage of the securing member;
a base shaft extending from the base in spaced-apart relationship to the extension member; and
a base gap between the base shaft and the extension member on a second side of the extension member, the base gap configured to enable passage of the securing member and the second securing member loop of the securing member extending through the base gap and detachably engaging the base shaft; and wherein passage of the securing member through at least one of the plurality of apertures, the mounting gap, and the base gap at least partially generates tension on the securing member;

a second securing member; and a second tensioning member carried by the second securing member, the second tensioning member extending through one of the plurality of apertures in the base of the first tensioning member.

18. The apparatus of claim 17 wherein the second tensioning member comprises:

a base;

a plurality of apertures in the base of the second tensioning member, the plurality of apertures in the base of the second tensioning member configured to enable passage of the second securing member;

a generally elongated extension member extending from the base of the second tensioning member;

a curved mounting member extending from the extension member of the second tensioning member, the curved mounting member extending through the one of the plurality of apertures in the base of the first tensioning member;

a mounting gap between the mounting member and the extension member on a first side of the extension member of the second tensioning member, the mounting gap configured to enable passage of the second securing member;

a base shaft extending from the base in spaced-apart relationship to the extension member of the second securing member; and a base gap between the base shaft and the extension member on a second side of the extension member of the second securing member, the base gap configured to enable passage of the second securing member; and wherein passage of the second securing member through at least one of the plurality of apertures, the mounting gap, and the base gap of the second tensioning member at least partially generates tension on the second securing member.

19. The tensioning tie down apparatus of claim 18 wherein the plurality of apertures comprises a primary aperture and a secondary aperture disposed in adjacent relationship to each other along a longitudinal axis of the base.

* * * * *